United States Patent [19]

Takimoto et al.

[11] Patent Number: 4,756,935

[45] Date of Patent: Jul. 12, 1988

[54] PRIMER COMPOSITION FOR A METALLIC MATERIAL AND A COATING METHOD USING THE SAME

[75] Inventors: Masaaki Takimoto; Tamotsu Sobata; Shinji Nakano, all of Osaka; Yuichi Yoshida, Kyoto, all of Japan

[73] Assignee: Nippon Paint Co., Ltd., Osaka, Japan

[21] Appl. No.: 907,211

[22] Filed: Sep. 12, 1986

[51] Int. Cl.$^4$ ............................................... B05D 1/36
[52] U.S. Cl. .................................. 427/410; 523/440; 523/465
[58] Field of Search ................. 427/410; 523/458, 465

[56] References Cited

U.S. PATENT DOCUMENTS

| | | | |
|---|---|---|---|
| 3,954,693 | 5/1976 | Fong | 523/458 |
| 3,992,358 | 11/1976 | Shinabeck | 523/458 |
| 4,042,550 | 8/1977 | Tuller et al. | 523/458 |
| 4,433,014 | 2/1984 | Gaske et al. | 427/410 |
| 4,542,070 | 9/1985 | Ohtani et al. | 427/410 |

FOREIGN PATENT DOCUMENTS 640547  5/1962  Canada ................ 427/410

OTHER PUBLICATIONS

D. S. Ehn et al, "Co-Cured Coating Process," I.B.M. Technical Disclosure Bulletin, vol. 23, No. 3, Aug. 1980.

*Primary Examiner*—Thurman K. Page
*Assistant Examiner*—L. R. Horne
*Attorney, Agent, or Firm*—Wenderoth, Lind & Ponack

[57] ABSTRACT

A primer composition for metallic material comprising (a) a urethane epoxy ester resin having primary hydroxyl groups and a number average molecular weight of 6000 to 12,000, (b) a chromate anticorrosive pigment and (c) a polyethylene wax having a density of 0.94 or more, a molecular weight of 1000 to 10,000 and an acid value of 15 or less (KOH mg/g), the pigment volume concentration being 24 to 45% of the total solids of the composition.

A chemical pretreatment on various metallic materials for improvements in scratch resistance, corrosion resistance and the like can be obviated by the use of said primer composition.

15 Claims, No Drawings

PRIMER COMPOSITION FOR A METALLIC MATERIAL AND A COATING METHOD USING THE SAME

FIELD OF THE INVENTION

The present invention relates to a primer composition for a metallic material and a coating method using the same. By the adoption of this invention, a metal pretreatment customarily required for improvements in scratch resistance, adhesion and corrosion resistance of the coating to be applied on a metallic material, and especially galvanized sheet steel, and aluminium containing hot dipped galvanized sheet steel, can be advantageously omitted.

BACKGROUND OF THE INVENTION

Recently, in various technical fields such as automobile, household products and electric appliance industries, demands for coated steel plates are increasing from the standpoint of productivity improvement and therefore, in the steel plate industry, energies are devoted to the development of plated steel plates which are excellent in both processability and corrosion resistance. Examples of such materials are aluminium containing hot dip galvanized sheet steel and the like. However, some of these plated steels cause troubles in connection with their chemical pretreatments for the purpose of improvements in scratch resistance, adhesion and corrosion resistance of the coating. For example, since a zinc phosphate film cannot effectively be formed on such plated steel because an amount of aluminium ions tend to accumulate in a treating bath and obstruct an effective film formation, a chromate coating is generally adopted as a preconstruction primer, but the scratch resistance of said primer can never reach the expected quality level.

On the other hand, in a chemical pretreatment for giving a phosphate coating, a chromate coating or the like, such miscellaneous expenses as equipment maintenance fee, treating bath maintenance fee, pollution control fee and the like, occupied in the total manufacturing cost are relatively high, and therefore, a further reduction in cost has been desired. Various coating compositions for precoat use have also been proposed for the improvements in processability and corrosion resistance of the coated steel plates. For example, the coating composition disclosed in Japanese Patent Publication No. 44569/77, comprises an epoxy base resin, an anticorrosive pigment and a lubricant and is claimed to be excellent in processability of the coating. However, as pointed out in the specification of said patent, for the obtainment of reliable scratch resistance, adhesion and corrosion resistance of the coating, it is essential to adopt a chemical treatment of the metal substrate. Thus, up to the present time, a primer composition for metallic material capable of resulting in a coating fully satisfying the latest quality requirements even when a chemical pretreatment is omitted, has never been provided.

An object of the present invention is, therefore, to provide a primer composition for metallic material capable of resulting in a coating with excellent scratch resistance, adhesion and corrosion resistance on a metallic material and especially galvanized iron, aluminium containing hot dipped galvanized iron, aluminium containing hot dipped galvanized sheet steel and the like.

An additional object of the invention is to provide a method for coating a metallic material with said primer composition and a top coat composition.

Further objects of the present invention are to provide a primer composition for metallic material which can evade the necessity of using a chemical pretreatment customarily adopted for the improvements in scratch resistance, adhesion and corrosion resistance of a coating and to provide a coating method using said primer composition.

Other objects of the invention shall be clear from the descriptions of the specification and claims.

SUMMARY OF THE INVENTION

With the abovesaid in mind, the inventors have endeavored to find an improved primer composition for metallic material, and have found (1) that a coating with high chromate content is excellent in corrosion resistance, but is rather poor in wet adhesive property, and however, when a particular binder resin is selectively used in this type of primer composition, both of the desired properties, i.e. corrosion resistance and wet adhesive property, can be realized therewith, (2) that an excellent scratch resistance of the coating can be obtained by the adoption of a combination of a particular binder resin and a particular polyethylene wax in that primer composition, and (3) that the pigment volume concentration in a primer composition has great influences on the scratch resistance and processability of the coating. On the basis of these findings, the present invention has been made.

According to the present invention, the aforesaid objects can be fully obtained by a primer composition for metallic material comprising as essential components, (a) 25 to 70% by weight (of the total solid matter of the composition, hereinafter the same) of urethane epoxy ester resin [C] having primary hydroxyl groups and having a number average molecular weight of 6000 to 12,000, (b) 25 to 50% by weight of chromate anticorrosive pigment, and (c) 1 to 10% by weight of polyethylene wax having a density of 0.94 or more, a molecular weight of 1000 to 10,000 and an acid value of 15 or less (KOH mg/g), the pigment volume concentration (PVC) being 25 to 45% of the total solid matter of the composition.

As the urethane epoxy ester resin [C] having primary hydroxyl groups, various resins have been known such as, for example, thermosetting resins described in Japanese Patent Application Kokai No. 30717/82, lactone modified urethane epoxy ester resins stated in Japanese Patent Application No. 45275/85 and the like. However, such resins may be easily and advantageously prepared by the following method.

That is, as a starting resinous material, use is made of a bisphenol type epoxy resin, a resorcinol type epoxy resin or mixture thereof, each containing 50 weight % or more phenol groups and having an epoxy equivalent of 100 to 6000.

Particularly useful members are the epoxy resins represented by the formula:

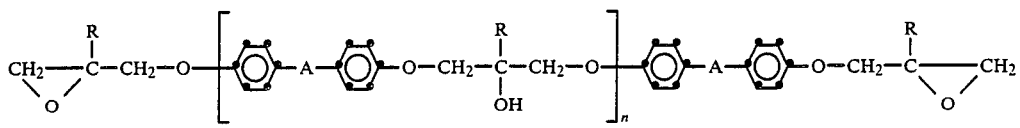

wherein R is hydrogen or methyl; —A— represents
>C(CH₃)₂, —CH₂—, —O—,

or —S—; and n is 0 or an integer of 1 to 14.

Examples of such resins are Epotohto YD-017, Epotohto YD-014, Epotohto YD-011 and Epotohto YD-128 (trademarks of epoxy resins, manufactured by Tohto Kasei), Epichlon 4050 (trademark of epoxy resin, manufactured by Dainippon Ink Chem. Co.) and the like. They may be used alone or in combination.

If desired, a part of such resin may be displaced by other epoxy resins such as, for example, polyalkylene glycol glycidyl ether having an epoxy equivalent of 100 to 6000.

However, even in that case, the displacement ratio should not exceed 50% by weight of said bisphenol or resorcinol type epoxy resin. This is because if the displacement ratio exceeds that limitation, there are undesirable lowering of such properties as corrosion resistance, water resistance, adhesion, chemical resistance, curing properties and the like. The aforesaid epoxy resin (a₁) is first reacted with a dicarboxylic acid component (a₂).

Examples of such dicarboxylic acids are polymethylene dicarboxylic acids such as adipic acid, azelaic acid, sebacic acid and the like; aromatic dicarboxylic acids such as phthalic anhydride, phthalic acid, isophthalic acid, terephthalic acid and the like; dimer acids, polybutadiene dicarboxylic acids, polyester dicarboxylic acids and other dicarboxylic acids having a molecular weight of less than about 5000.

One or two or more of these acids are employed. Among them, preference is given to polymethylene dicarboxylic acids and especially azelaic acid from the standpoint of solubility and compatibility of the formed resin and processability of the coated sheet steel. If desired, said acid component (a₂) may include trivalent carboxylic acid having a molecular weight of less than 5000 in an amount not exceeding 50% by weight of the total acids (a₂).

By the reaction of said epoxy resin and said dicarboxylic acid components, the epoxy groups are ring-opened and said acids are incorporated into the resin via ester bonding. At this time, an amine catalyst may be advantageously used and in a preferable embodiment of the invention, a secondary amine (a₃) having a primary hydroxyl group is specifically selected and this amine is also incorporated into the resin, giving additional primary hydroxyl groups to the formed resin. Thus obtained epoxy ester resin having primary hydroxyl groups shall be referred to as resin [A₁].

As the secondary amine, one may use, for example, dialkanol amines (e.g. diethanol amine, dipropanol amine, dibutanol amine and the like), alkyl alkanol amines (e.g. ethyl ethanol amine) and the like. One or 2 or more of these amines are employed. Among them, preference is given to dialkanol amines and especially diethanol amine. It is, of course, possible to use as an amine catalyst a tertiary amine (e.g. triethyl amine, tributyl amine and the like) or an ammonium compound (e.g. tetramethylammonium chloride, tetrabutylammonium chloride and the like), and however in that case, primary hydroxyl groups can never be added to the epoxy resin. Such epoxy ester resin shall be referred to as resin [A₁'].

The formation of said epoxy ester resin [A₁] or [A₁'] may be carried out as follows. That is, the epoxy resin is first melted or dissolved in an appropriate inert solvent, added with a dicarboxylic acid component and an amine catalyst and the combined mixture is heated, preferably under nitrogen gas stream, and reacted at 80° to 200° C. for 1 to 15 hours.

In order to make the effects of the invention develop in full, the said epoxy ester resin [A₁] is reacted with a cyclic ester compound (a₄) represented by the formula:

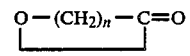

in which n is an integer of 4 to 10, whereby the lactone is incorporated into the primary and the secondary hydroxyl groups of the resin via ester bonding. Thus obtained lactone modified epoxy ester resin shall be referred to as resin [A₂].

The resin [A₁'] may be used in place of [A₁] in the abovesaid reaction. Thus obtained lactone modified epoxy ester resin shall be referred to as resin [A₃].

Examples of such cyclic lactone compounds (a₄) are ε-caprolactone, ξ-enantholactone, η-caprylolactone and ring substituted derivatives thereof. Particular preference is given to the members having 6 to 8 carbon atoms.

In that reaction, such catalyst (a₅) as tin compounds, lead or manganese organic acid salts may be advantageously used. Particularly preferable catalyst are the compounds represented by either one of the following formulae:

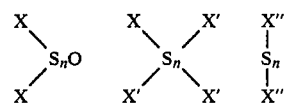

in which X is an alkyl group, an aryl group, an aralkyl group, or an allyloxy group; X' is an alkyl group, an aryl group, an aralkyl group, an acyloxy group, a halogen atom, or hydroxyl group; and X" is a halogen atom.

Examples of such catalysts are stannous chloride, tetraphenyl tin, tetraoctyl tin, diphenyl tin dilaurate, tri-n-butyl tin hydroxide, tri-n-butyl tin acetate, dimethyl tin oxide, dibutyl tin oxide, dilauryl tin oxide, di-n-butyl tin dichloride, dioctyl tin dichloride, lead acetate, manganese acetate, lead 2-ethyl hexane acetate, lead salicylate, lead benzoate and the like.

The lactone moiety of said resin [$A_2$ or $A_3$] has a function of giving flexibility to the epoxy ester resin under the state combined to the epoxy ester chain. However, at the same time, the inventors have found that the amount of said lactone in the resin has a considerable effect on the wet adhesive property (i.e. adhesive property tested on a coated sheet steel which has been immersed in hot water for a defined period of time) and, for a satisfactory wet adhesion, it should be 1% or more by weight of the urethane epoxy ester resin having primary hydroxyl groups. If it exceeds 30% by weight, there is a tendency that the resulting resin will become too soft and chemical resistance, humidity resistance and scratch resistance of the coating will get worse. Therefore, the lactone amount should preferably be within a limit of 1 to 30% by weight of the urethane epoxy ester resin having primary hydroxyl groups.

Next, the abovesaid epoxy ester resin [A] (at least one of said [$A_1$], [$A_2$] and [$A_3$]) is reacted with a partially blocked polyisocyanate compound [B], which is obtained by reacting a polyisocyanate compound ($b_1$) and an isocyanate blocking agent ($b_2$) so as to give a ratio of number of isocyanate groups in ($b_1$) to number of active hydrogen atoms in ($b_2$) of 5/1 to 5/4.

The abovesaid reaction may be carried out in the absence or in the presence of an inert solvent at a temperature ranging from room temperature to 150° C. From the standpoint of product quality and reaction control, it is preferred to dissolve the $b_1$ component in an inert solvent and after heating at 50° to 100° C., dropwise add the $b_2$ component or its solution in an appropriate inert solvent to effect the reaction.

As the abovesaid polyisocyanate compound ($b_1$), mention is made of aliphatic or alicyclic diisocyanates such as hexamethylene diisocyanate, isophorone diisocyanate, hydrogen diphenyl methane diisocyanate and the like; aromatic diisocyanates such as tolylene diisocyanate, diphenyl methane-4,4'-diisocyanate and the like; triisocyanates such as adducts of 1 mole of trimethylol propane and 3 moles of the aforesaid diisocyanates, trimers of such diisocyanates as hexamethylene diisocyanate, tolylene diisocyanate and the like. One or two or more of said polyisocyanates may be satisfactorily used. Among them, preference is given to aliphatic or alicyclic diisocyanates from the standpoint of solubility, compatibility and processability of the formed thermosetting resin.

The isocyanate blocking agent ($b_2$) must be such material that when reacted with the abovesaid ($b_1$) compound, thus formed adduct is stable at room temperature but can be dissociated at an elevated temperature of 140° to 250° C. to reproduce free isocyanate groups.

Examples of such agents are lactam series blocking agents such as $\epsilon$-caprolactam, $\gamma$-butyrolactam and the like; oxime series blocking agents such as methyl ethyl ketoxime, cyclohexanone oxime and the like; alcohol series blocking agents such as methanol, ethanol, isobutyl alcohol and the like, and phenol series blocking agents such as phenol, p-t-butyl phenol, cresol and the like.

The present urethane epoxy ester resin having primary hydroxyl groups may be advantageously and effectively prepared by the reaction of said product [A] and said product [B]. At this time, it is essential that the amounts of said [A] and said [B] are settled so as to give the ratio of number of primary hydroxyl groups in said [A] to number of free isocyanate groups in said [B] of 10/1 to 10/8, preferably 10/1 to 10/6. This is because if the said ratio exceeds the limit of 10/1, there is a tendency that the curing property of the coating will get worse, and if it is less than 10/8, it will cause gelation at the time of preparation of the present primer composition.

The abovementioned reaction is usually carried out at 50° to 150° C., preferably under nitrogen gas stream, for a sufficient time to complete consumption of the existing isocyanate groups. If desired, said reaction may be cut at the stage where a certain amount of isocyanate groups still remain but the molecular weight of the formed resin has reached the desired level, and finalized by adding, for example, a primary alcohol.

Thus obtained urethane epoxy ester resin having primary hydroxyl groups should preferably have a number average molecular weight of 6000 to 12,000. This is because if the molecular weight is less than 6000, there is an undesired decrease in bending property and in corrosion resistance of the coating, whereas if it exceeds the upper limit of 12,000, there occurs an undesired gelation of the coating composition.

This control may be advantageously and effectively done by the molecular weight of the epoxy ester principal chain. It is generally preferred that the ratio of gram equivalent of glycidyl groups in epoxy resin ($a_1$) to gram equivalent of carboxyl groups in polycarboxylic acid ($a_2$) be settled in a range of 1.1 to 1.4, more preferably 1.15 to 1.25 and that the reaction is completed so as to give an acid value of the reaction product of ($a_1$) and ($a_2$) of 2 or less (KOH mg/g), and more preferably 1 or less (KOH mg/g).

Thus obtained thermosetting resin contains a number of reactive primary hydroxyl groups in its molecule and therefore, can provide a primer composition excellent in adhesive property, processability, corrosion resistance, water resistance, chemical resistance and the like.

The inclusion of the lactone moiety is very useful not only in the sense that the reactive primary hydroxyl groups are added to the formed resin, but also in the sense that adhesion, wet adhesive property and boiling water resistance of the coating are greatly improved due to the internal stress relaxation by the methylene chain thereof.

Therefore, these properties, coupled with excellent processability and low temperature curing properties, make the epoxy ester resin an ideal material for the preparation of primer composition for precoat metal use.

In the present invention, a part of said thermosetting resin may be displaced by a resol type phenol resin if desired. At that time, any of the resol type phenol resins obtained by the condensation reaction of phenols and formaline in the presence of an alkali may be satisfactorily used, and however, particularily preferable members are the resol type phenol resins of the formula:

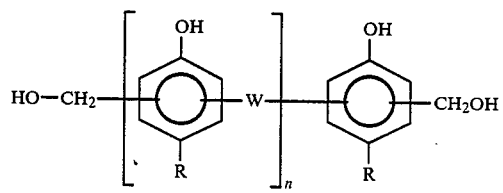

in which n is 0 or an integer of 1 to 4; W is —$CH_2$— or —$CH_2$'O—$CH_2$—; and R is $CH_3$, H or

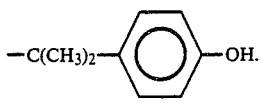

The inventors have found that up to 40% by weight of said thermosetting resin may be displaceable with a resol type phenol resin and that if the phenol resin exceeds the maximum limit of 40%, there is a considerable decrease in processability and therefore, such a large quantity of phenol resin should be avoided for the objects of the present invention.

Nevertheless, inclusion of such phenol resin is sometimes advisable because the presence of such resin makes a great contribution to the improvement in wet adhesive property and hence in corrosion resistance of the coating.

However, in the present invention, an amino resin customarily compounded with a thermosetting resin should not be used as a substituting resin, because there is a clear tendency that corrosion resistance and anti-blistering property of the coating are lowered.

The exact reasons are unknown, but this is especially true when a chemical pretreatment is omitted and a primer composition having a high PVC is used as in the present invention.

The inventors have surprisingly found that even if a large quantity of chromate pigment is compounded with the aforesaid resinous vehicle, no detectable decreases in water resistance, wet adhesive property and interlaminar adhesion are observed. Therefore, in the present invention, chromate anticorrosive pigments are used in such a large amount as 25 to 50% by weight of the total solids of the primer composition, giving a far improved anticorrositive effect.

As the chromate pigment, particular preference is given to strontium chromate or a mixture of strontium chromate and calcium chromate (less than 50% of the mixture). The maximum anticorrosion effect may be obtained with strontium chromate for aluminium containing galvanized iron and with a mixture of strontium chromate and calcium chromate for a common hot dipped galvanized sheet steel.

When a mixture of strontium chromate and calcium chromate is used, the ratio of said compounds is preferably selected in a range of 1:1 to 1:0.1. Calcium chromate is added for the purpose of additional improvement in corrosion resistance, but too excessive amounts of this particular pigment are not recommended because of undesired decrease in anti-blistering property.

Incidentally, the chromate anticorrosive pigment should be, as stated hereinbefore, 25 to 50% by weight of the total solids of the primer composition. This is because if the chromate pigment is outside said range, there is an undesirable decrease in corrosion resistance of the coating. Though it is not essential in the present invention, in a preferable embodiment, a pH controlling pigment is included in the present primer composition for the purpose of increasing a cathodic polarization effect in an aqueous saline solution and controlling pH change in a corrosive area on a metallic surface, and particularly, mainly of zinc metal. By the presence of said pH controlling pigment, pH of the composition in an aqueous saline solution is effectively controlled in a range of 6 to 11. This is because if the pH is less than 6, there is a tendency that the desired anticorrosive property be lowered, and if the pH is over 11, both anticorrosive property and anti-blistering property will be lowered.

As the pH controlling pigment, any of the pigments whose solubilities (JIS-K-5101) are within a range of 0.001 to 5% and which are effective for the control of the coating composition as shown above may be satisfactorily used.

Examples of such members are barium metaborate, zinc phosphate, calcium phosphate, zinc molybdate, calcium carbonate, calcium molybdate, dihydrogen aluminium tripolyphosphate and the like. In general, the maximum anticorrosive effect can be attained with calcium carbonate for aluminium containing galvanized sheet steel and dihydrogen aluminium tripolyphosphate for a hot dipped galvanized sheet steel. Such pH controlling pigment is generally used in an amount corresponding to 5 to 15% by weight of the total solid matter of the coating composition. This is because if the amount is less than 5% by weight, it is unable to get a sufficient effect, and if it exceeds the upper limit of 15% by weight, there is a tendency that anti-blistering property will get worse in return.

Besides the chromate anticorrosive pigment and the pH controlling pigment, the present primer composition may include coloring pigment, electrically conducting pigment and other pigments as desired. However, in the present invention, the overall volume pigment concenration (PVC) should be in a range of 25 to 45% and preferably 30 to 40%. The inventors have found that if the PVC is less than 25%, there is no increase in scratch resistance of the coating, and if it exceeds 45%, there is an undesired decrease in bending processability of the coating.

In the present invention, a particular polyethylene wax is added as the third essential component to the primer composition for the improvement in scratch resistance of the coating produced. The polyethylene wax used in the present invention is characterized by having a high density (0.94 or more), an average molecular weight of 1000 to 10,000 and an acid value of 15 or less, and preferably 0 (KOH mg/g). Such wax is incompatible with the present thermosetting resin and is distributed in a resinous coating as islands in a sea. This characteristic per se contributes toward the improvement in scratch resistance of the coating. Other polyethylene waxes outside the invention exhibit only poor activities and hence cannot be used in the present invention. The amount of said polyethylene wax should preferably be set in a range of 1 to 10% by weight of the total solids of the primer composition. This is because if it is less than 1%, there is no increase in scratch reistance of the coating, and if it exceeds 10%, there is a tendency that an interlaminar adhesion and especially between a top coat and the primer coating will be lowered.

Thus, in the present primer composition, a particular resinous vehicle is selected for the improvement in wet adhesive property, a comparatively larger amount of an anticorrosive pigment is compounded together with a defined amount of pH controlling pigment, thereby obtaining the maximum cathodic polarization effect and improving the inherent corrosion resistance, the pigment volume concentration is controlled in a defined range so as to give the maximum effects of these pigments, and a particular polyethylene wax is compounded for the improvement in scratch resistance of the coating. Therefore, the present composition is quite useful as primer composition for various metallic materials including hot dipped galvanized sheet steel, aluminium containing hot dipped galvanized sheet steel, zinc electroplated sheet steel, cold rolled steel sheet and the like, such as, for example, coil coating primer, precoat metal primer for electrical appliance and the like.

The inventors have also found that even if a chemical pretreatment customarily used for these metallic materials is omitted, fully satisfactory results may be obtained with the present primer composition. And, on the basis of this finding, the inventors established an excellent method for coating galvanized steels. That is, according to the present invention, there is provided a method for coating metallic materials comprising applying said primer composition directly on the metallic material or on the material previously washed with an aqueous alkali solution (for surface conditioning), washing with water and drying, and after baking and drying, applying a top coat on said primer coating. By this method, an excellent coated plate in respects of corrosion resistance, processability and scratch resistance can be produced easily and economically. For the surface conditioning, at least one alkali selected from silicates, carbonates and phosphates capable of exhibiting pH 7 or more can be used in the form of 1 to 10 wt% aqueous solution. In an actual operation, a metallic material is dipped in said aqueous alkali solution or applied with said solution by spraying or the like. Said contact is usually carried out at a solution temperature of 40° to 70° C. for 1 second to 1 minute. After treating with said alkali solution, the material is washed with water and dried, usually by hot air (80° to 100° C.) and the like.

The inventors have found that by the adoption of said surface conditioning step, an oxide coating formed on sheet steel is modified and its coating adhesive property is greatly improved, and that for the said surface conditioning purpose, a combination of silicate and carbonate is specifically preferred. If desired, the metallic material may be subjected to a chromate rinse operation comprising contacting with an acidic, chromic acid containing solution and drying, prior to the application of said primer composition. By this chromate rinse, corrosion resistance of the coated plate can be further improved. As the acidic, chromic acid containg solution, preference is given to an aqueous partially reduced chromic anhydride solution such as, for example, Deoxylite 41 (chromate rinse agent, manufactured by Nippon Paint Co.). The concentration of $Cr^{+6}$ in such solution is usually 0.01 to 1 wt % and the solution is contacted with the metallic material by a conventional means, for example, by dipping or spraying means, for 1 second to 1 minute at a solution temperature of room temperature to 70° C. The drying is carried out as in the surface conditioning step.

Next, in the present invention, the aforesaid primer composition is applied in a dry thickness of about 3 to 10 microns. This is because, if the coating thickness is less than 3 microns, there is a tendency that scratch resistance, adhesion and corrosion resistance of the coating will become worse, and if it exceeds 10 microns, adhesion property will likewise get worse. In applying the primer composition, any of the known methods including spraying, roll coating, shower coating and the like may be satisfactorily used, and the applied composition is baked and dried at a temperature of 250° C. or less, preferably 180° to 250° C. On this primer coating, a top coat is applied in a conventional way, to obtain a coated steel sheet which is excellent in processability, corrosion resistance and scratch resistance.

As already stated, a conventional chemical pretreatment for the improvement in corrosion resistance of a coated plate may be omitted, and an excellent product with respects to corrosion resistance, interlaminar adhesion, processability and scratch resistance can be easily and economically produced.

The invention shall be now more fully explained in the following Examples. Unless otherwise stated, all parts and percentages are by weight.

MANUFACTURING EXAMPLE 1

Preparation of resin C-1

475 parts of Epotohto YD-014 (epoxy resin, epoxy equivalent 950, trademark of Tohto Kasei) were dissolved in a mixture of 95 parts of xylene and 119 parts of Cellosolve acetate (acetic acid ester of ethyleneglycol monoethyl ether, trademark of UCC). To this, were added 39.2 parts of azelaic acid and 8.3 parts of diethanolamine and the mixture was reacted, under nitrogen gas stream, at 145° C. for 6 hours until the resinous acid value reached to 1.1 KOH mg/g. After cooling to 100° C., 105 parts of ε-caprolactone and 0.3 part of stannous chloride were added and the combined mixture was again heated to 140° C. and maintained at the same temperature for additional hours. The amounts of unreacted ε-caprolactone were traced by IR inspection of sample materials successively taken out and the reaction was stopped at the stage when the reaction percentage reached 98% or more.

After completion of said reaction, the reaction mixture was added with 209 parts of xylene and 130 parts of methylethyl ketone and allowed to cool to obtain the product A-1. In a separate reaction vessel, were placed 222 parts of isophorone diisocyanate and 222 parts of Cellosolve acetate and the mixture was heated to 80° C. To this, a mixed solution of 113 parts of ε-caprolactam and 113 parts of Cellosolve acetate was dropwise added in 1 hour and the combined mixture was reacted at 80° C. for 3 hours to obtain the product B-1 having an isocyanate equivalent of 670 gram equivalent.

Next, 55.9 parts of said product B-1 and 118 parts of Cellosolve acetate were added to said product A-1 L and the combined mixture was reacted at 100° C. for 3 hours. Thereafter, 102 parts of isopropyl alcohol were added and the mixture was allowed to cool to obtain a thermosetting resin varnish C-1.

MANUFACTURING EXAMPLE 2

Preparation of urethane epoxy ester resin C-2

475 parts of Epotohto YD-014 (epoxy resin, epoxy equivalent 950, trademark of Tohto Kasei) were disoolved in a mixture of 95 parts of xylene and 119 parts of Cellosolve acetate. To this, were added 39.2 parts of azelaic acid and 8.3 parts of diethanolamine and the combined mixture was reacted at 145° C. for 6 hours until the resinous acid value reached 1.1 KOH mg/g. At this stage, 209 parts of xylene and 130 parts of methylethyl ketone were added and the combined mixture was allowed to cool to obtain the product A-2.

Separately, 222 parts of isophorone diisocyanate were dissolved in 222 parts of Cellosolve acetate and the solution was heated to 80° C. To this, a mixture of 113 parts of ε-caprolactam and 113 parts of Cellosolve acetate was dropwise added in 1 hour, and after completion of said addition, the combined mixture was reacted at 80° C. for 3 hours to obtain the product B-2 having an isocyanate equivalent of 670 gram equivalent.

55.9 parts of thus obtained product B-2 and 118 parts of Cellosolve acetate were added to said product A-2 and the combined mixture was reacted at 100° C. for 3 hours.

Thereafter, 102 parts of isopropyl alcohol were added and the mixture was allowed to cool to obtain a thermosetting resin varnish C-2.

EXAMPLE 1

Preparation of primer composition No. 1 (PVC 34%)

| | |
|---|---|
| (a) lactone modified urethane epoxy ester resin varnish C-1, in solid | 29 parts |
| (b) resol type phenol resin BKS-316 manufact. by Showa Kobunshi), in solid | 7 |
| (c) strontium chromate N (strontium chromate pigment, by Kikuchi Shikiso Kogyo) | 40 |
| (d) calcium carbonate pigment (manufact. by Maruo Calcium) | 10 |
| (e) Titanium CR-91 (titanium oxide trademark of Ishihara Sangyo) | 12 |
| (f) polyethylene wax (density 0.95–0.97, molecular weight 2000, acid value 0) | 2 |
| (g) cyclohexanone (viscosity controlling solvent) | |

(c), (d), (e) and (f) were added to (a) and the mixture was kneaded with 3 rollers. Thereafter, (b) was added and the mixture was added with (g) to adjust the viscosity to an appropriate level to obtain a primer coating composition.

EXAMPLE 2

Preparation of primer composition No. 2 (PVC 34%)

Repeating the same procedures of Example 1 but using the following materials, a primer coating composition No. 2 was prepared.

| | |
|---|---|
| (a) lactone modified urethane epoxy ester resin varnish C-1, in solid | 29 parts |
| (b) resol type phenol resin BKS-316, in solid | 7 |
| (c) strontium chromate N | 25 |
| (d) calcium chromate D (calcium chromate pigment, manufact. by Kikuchi Shikiso Kogyo) | 15 |
| (e) dihydrogen aluminium tripolyphosphate | 8 |
| (f) Titanium CR-91 | 14 |
| (g) polyethylene wax (density 0.95–0.97, molecular weight 2000, acid value 0) | 2 |
| (h) cyclohexanone | |

EXAMPLE 3

Preparation of primer composition No. 3

The same procedures of Example 2 were repeated excepting substituting resin varnish C-2 for the varnish C-1, to obtain a primer composition No. 3.

COMPARATIVE EXAMPLES 1 AND 2

Using the same method as stated in Example 1, but following the prescriptions shown below, comparative primer compositions No. 4 and No. 5 were prepared.

Primer composition No. 4 (PVC 21%)

| | |
|---|---|
| (a) urethane epoxy ester resin varnish C-2, in solid | 50 parts |
| (b) Cymel 303 (methoxymethylol melamine, trademark of ACC) | 5 |
| (c) strontium chromate N | 20 |

-continued

| | |
|---|---|
| (d) No. 1 Clay (clay pigment, manufact. by Maruo Calcium) | 10 |
| (e) Titanium CR-91 | 15 |
| (f) cyclohexanone | |

Primer composition No. 5 (PVC 19%)

| | |
|---|---|
| (a) urethane epoxy ester resin varnish C-2, in solid | 50 parts |
| (b) Cymel 303 | 5 |
| (c) strontium chromate N | 20 |
| (d) No. 1 Clay | 10 |
| (e) Titanium CR-91 | 11 |
| (f) polyethylene wax (density 0.92, molecular weight 30,000, acid value 20) | 4 |
| (g) cyclohexanone | |

EXAMPLE 4

5% aluminium containing hot dipped galvanized sheet steel was sprayed with an aqueous solution containing 1.5% by weight of alkali rinse agent comprising as essential components 60% by weight of sodium methasilicate and 20% by weight of sodium carbonate (pH 12, temperature 60° to 70° C.), for 5 seconds, washed with water and subjected to a hot air (80° to 100° C.), hydro-extracting drying to effect surface conditioning thereof.

Next, the primer composition No. 1 obtained in Example 1 was applied onto the said sheet steel to a dry thickness of 5μ, and baked at 220° C. Thereafter, Superlac DIF OX-97 (Nippon Paint Co.) was coated as a top coat in a dry thickness of 12μ thereon, and baked at 210° C. to obtain a coated plate (1).

EXAMPLE 5

The same procedure as stated in Example 4 were repeated excepting using 55% aluminum containing hot dipped galvanized sheet steel in place of 5% aluminum containing galvanized sheet steel. Thus obtained product was referred to a coated plate (2).

EXAMPLES 6 TO 7

Commercialized hot dipped galvanized sheet steel (Zn 250 g/m² in both side surfaces) was subjected to a surface conditioning step as in Example 4 and then applied with a primer composition (No. 2 or No. 3) and a top coat as in Example 4. Thus obtained products were referred to as coated plates (3) and (4), respectively.

COMPARATIVE EXAMPLE 3

To a 55% aluminium containing hot dipped galvanized sheet steel previously treated with a zinc phosphate bath, a primer composition No. 4 was applied and then a top coat was applied thereon as in Example 4, to obtain a coated plate (5).

COMPARATIVE EXAMPLE 4

Using a 5% aluminium containing hot dipped galvanized sheet steel previously treated with a coating type chromate composition, i.e. an aqueous, partially reduced chromic acid solution added with fumed silica, so as to give Cr 45 mg/m², the same procedures of Comparative Example 3 were repeated to obtain a coated plate (6).

COMPARATIVE EXAMPLE 5

A 5% aluminium containing hot dipped galvanized sheet steel was subjected to a surface conditioning as in Example 4, and then a coated plate (7) was prepared using a primer composition No. 5, as in Example 4.

COMPARATIVE EXAMPLE 6

Using a commercialized hot dipped galvanized sheet steel (Zn 250 g/m² in both side surfaces), the procedures of Comparative Example 5 were repeated to obtain a coated plate (8).

The following tests were carried out with the coated plates of Examples 4 to 7 and Comparative Examples 3 to 6 and coating properties were evaluated. The test results are shown in Table 1.

TEST METHODS (1) bending processability:

2 sheets of the test plates with the same thickness were vise pressed at 20° C. and bended. Bending processability was judged, following the criteria shown below, from the tape peeling at the bended portion.

(2) coin scratch resistance:

Test plate was rubbed with a 10 Yen coin at 45° angle and scratch resistance of the coating was examined.

(3) resistance to salt spray fog:

Test plate was cut to the metal substrate and tested in a salt fog chamber (JIS-Z-2371) for 500 H and 1000 H. Tape peeling tests were carried out with the respective test plate.

EVALUATION STANDARDS (1) bending processability:
○ no peeling
⊙ 1 to 2 points peeled out (practically useful level)
Δ certain peeling (no useful)
X over one half peeling (no useful)

(2) coin scratch resistance:
○ no scratch in the substrate
⊙ slight scratch in the substrate
Δ moderate scratches in the substrate
X complete peeling of coating (3) resistance to salt spray fog:

| | peeling width |
|---|---|
| ○ | 0~1.0 mm |
| Δ | 1.1~2.0 mm |
| X | 2.1 mm or more |

TABLE 1

| | Example | | | | Comp. Example | | | |
|---|---|---|---|---|---|---|---|---|
| | 4 | 5 | 6 | 7 | 3 | 4 | 5 | 6 |
| coated plate | 1 | 2 | 3 | 4 | 5 | 6 | 7 | 8 |
| bending processability | ○ | ○ | ○ | ○ | ○ | ⊙ | ⊙ | ⊙ |
| coin scratch resistance | ○ | ○ | ○ | ○ | Δ | Δ | X | X |
| resistance to salt spray fog | | | | | | | | |
| 500 H | ○ | ○ | ○ | ○ | Δ | ○ | X | X |
| 1000 H | ○ | ○ | ○ | Δ | X | ○ | X | X |

What is claimed is:

1. A primer composition for metallic material comprising:
   (a) 25 to 70% by weight of a primary hydroxyl group bearing urethane epoxy ester resin (C) which is obtained by reaction of a primary hydroxyl group bearing epoxy ester resin (A) and a partially blocked polyisocyanate compound (B) so as to give a ratio of primary hydroxyl groups in said (A) to free isocyanate groups in said (B) of 10/1 to 10/8, and whose number average molecular weight is 6000 to 12,000,
   (b) 25 to 50% by weight of chromate anticorrosive pigment, and
   (c) 1 to 10% by weight of polyethylene wax having a density of 0.94 or more, a molecular weight of 1000 to 10,000 and an acid value of 15 or less as KOH mg/g, the composition having a pigment volume concentration of 25 to 45% of the total solid matter of the composition, all weight percentages being based on the weight of the total solid matter of the composition.

2. A composition according to claim 1, wherein the primary hydroxyl group bearing epoxy ester resin (A) is a reaction product of:
   ($a_1$) an epoxy resin having a phenol content of 50% or more and an epoxy equivalent of 100 to 6000 which is selected from the group consisting of a bisphenol epoxy resin, a resorcinol epoxy resin and a mixture thereof,
   ($a_2$) a dicarboxylic acid, and
   ($a_3$) a secondary amine having at least one primary hydroxyl group.

3. A composition according to claim 1, wherein the primary hydroxyl group bearing epoxy ester resin (A) is a reaction product of:
   ($a_1$) an epoxy resin having a phenol content of 50% or more and an epoxy equivalent of 100 to 6000 which is selected from the group consisting of a bisphenol epoxy resin, a resorcinol epoxy resin and a mixture thereof,
   ($a_2$) a dicarboxylic acid,
   ($a_3$) a secondary amine having at least one primary hydroxyl group, and
   ($a_4$) a cyclic ester compound represented by the formula:

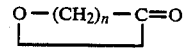

in which n is an integer of 4 to 10.

4. A composition according to claim 1, wherein the primary hydroxyl group bearing epoxy ester resin (A) is a reaction product of:
   ($a_1$) an epoxy resin having a phenol content of 50% or more and an epoxy equivalent of 100 to 6000 which is selected from the group consisting of a bisphenol epoxy resin, a resorcinol epoxy resin and a mixture thereof,
   ($a_2$) a dicarboxylic acid,
   ($a_3$)' a tertiary amine or an ammonium compound, and
   ($a_4$) a cyclic ester compound represented by the formula:

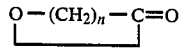

in which n is an integer of 4 to 10.

5. A composition according to claim 1, wherein the partially blocked polyisocyanate compound (B) is a reaction product of:
   ($b_1$) a polyisocyanate compound, and
   ($b_2$) an isocyanate blocking agent, the ratio of isocyanate groups in ($b_1$) to active hydrogen atoms in ($b_2$) being 5/1 to 5/4.

6. A composition according to claim 1, wherein the chromate anticorrosive pigment is strontium chromate pigment or a mixture of strontium chromate pigment and less than 50% calcium chromate pigment.

7. A composition according to claim 1, wherein a pH controlling pigment is included together with the chromate anticorrosive pigment.

8. A composition according to claim 7, wherein the pH controlling pigment is a pigment whose solubility in water is 0.001 to 5% and whose pH is a brine suspension is 6 to 11.

9. A composition according to claim 8, wherein the pH controlling pigment is calcium carbonate or dihydrogen aluminium tripolyphosphate.

10. A composition according to claim 1, wherein up to 40% by weight of said urethane epoxy resin (C) is replaced by a resol phenol resin of the formula:

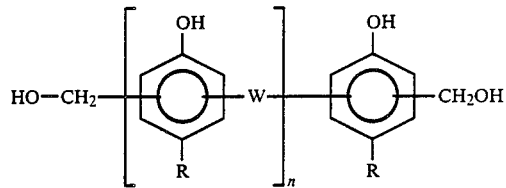

in which n is 0 or an integer of 1 to 4; W is —CH$_2$— or —CH$_2$—O—CH$_2$—; and R is CH$_3$, H or

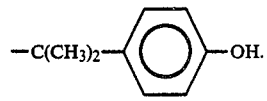

11. A method for coating a metallic material comprising applying the coating composition of claim 1 onto a metallic material, baking and drying the coating, and then applying a top coat thereon.

12. A method according to claim 11 wherein the metallic material is a galvanized iron or an aluminium containing hot dipped galvanized sheet steel.

13. A method according to claim 11 wherein the metallic material is previously washed with an aqueous alkaline solution, washed with water and then dried.

14. A method according to claim 13 wherein the alkaline solution is an aqueous solution of at least one alkali selected from the group consisting of alkali silicates, alkali carbonates and alkali phoshates.

15. A method according to claim 11 wherein the metallic material is previously treated with an aqueous acidic solution containing chromic acid and then dried.

* * * * *